(12) United States Patent
Akif

(10) Patent No.: US 12,479,396 B2
(45) Date of Patent: Nov. 25, 2025

(54) ENERGY ABSORPTION DEVICE WITH PEDESTRIAN PROTECTION FUNCTION FOR A MOTOR VEHICLE

(71) Applicant: Bayerische Motoren Werke Aktiengesellschaft, Munich (DE)

(72) Inventor: Oeztzan Akif, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 347 days.

(21) Appl. No.: 18/033,609

(22) PCT Filed: Nov. 12, 2021

(86) PCT No.: PCT/EP2021/081571
§ 371 (c)(1),
(2) Date: Apr. 25, 2023

(87) PCT Pub. No.: WO2022/112026
PCT Pub. Date: Jun. 2, 2022

(65) Prior Publication Data
US 2024/0017692 A1    Jan. 18, 2024

(30) Foreign Application Priority Data
Nov. 25, 2020   (DE) ............... 10 2020 131 236.9

(51) Int. Cl.
*B60R 21/34* (2011.01)
*B60R 19/18* (2006.01)
(Continued)

(52) U.S. Cl.
CPC ............ *B60R 21/34* (2013.01); *B60R 19/18* (2013.01); *B60R 19/483* (2013.01); *B60R 21/0136* (2013.01); *B60R 2021/343* (2013.01)

(58) Field of Classification Search
None
See application file for complete search history.

(56) References Cited

U.S. PATENT DOCUMENTS

| 3,888,531 A | 6/1975 | Straza et al. |
| 8,368,523 B2 * | 2/2013 | Takahashi ........... B60R 21/0136 |
| | | 180/274 |

(Continued)

FOREIGN PATENT DOCUMENTS

| CN | 101258058 A | 9/2008 |
| CN | 105142986 A | 12/2015 |

(Continued)

OTHER PUBLICATIONS

International Search Report (PCT/ISA/210) issued in PCT Application No. PCT/EP2021/081571 dated Mar. 1, 2022 with English translation (six (6) pages).

(Continued)

*Primary Examiner* — Joseph D. Pape
(74) *Attorney, Agent, or Firm* — Crowell & Moring LLP

(57) ABSTRACT

An energy absorption device with a pedestrian protection function for a motor vehicle includes a deformation structure which can be deformed based on pulses at different force levels in a switchable manner. The energy absorption device additionally has a sensor console which is arranged parallel to the deformation structure and which protrudes in the deformation direction beyond the deformation structure in the direction of the vehicle exterior. The sensor console is designed to support a collision detection sensor.

10 Claims, 2 Drawing Sheets

(51) Int. Cl.
    *B60R 19/48*     (2006.01)
    *B60R 21/0136*     (2006.01)

(56) References Cited

U.S. PATENT DOCUMENTS

| | | | |
|---|---|---|---|
| 9,650,013 B2 * | 5/2017 | Gaas | ............ B60R 19/483 |
| 2009/0108598 A1 | 4/2009 | Takahashi | |
| 2016/0009237 A1 | 1/2016 | Rahe et al. | |
| 2018/0272971 A1 | 9/2018 | Syvertsen et al. | |
| 2018/0281712 A1 | 10/2018 | Hiermaier et al. | |
| 2019/0016295 A1 | 1/2019 | Naderer et al. | |
| 2021/0009076 A1 | 1/2021 | Akif et al. | |

FOREIGN PATENT DOCUMENTS

| | | |
|---|---|---|
| CN | 107000665 A | 8/2017 |
| DE | 24 13 772 A1 | 9/1974 |
| DE | 100 39 755 A1 | 2/2002 |
| DE | 10 2005 005 881 A1 | 3/2006 |
| DE | 10 2010 022 686 A1 | 1/2011 |
| DE | 10 2010 054 641 A1 | 6/2012 |
| DE | 10 2012 112 636 A1 | 7/2014 |
| DE | 10 2013 000 391 A1 | 7/2014 |
| DE | 10 2013 000 481 A1 | 7/2014 |
| DE | 10 2015 210 191 A1 | 1/2016 |
| DE | 10 2015 208 719 A1 | 6/2016 |
| DE | 10 2015 223 547 A1 | 6/2017 |
| DE | 10 2015 224 456 A1 | 6/2017 |
| DE | 10 2016 204 264 A1 | 9/2017 |
| DE | 10 2016 216 048 A1 | 3/2018 |
| DE | 102016216048 * | 3/2018 |
| DE | 10 2018 204 656 A1 | 10/2019 |
| JP | 5358547 * | 12/2013 |
| JP | 2016-165977 A | 9/2016 |

OTHER PUBLICATIONS

German-language Written Opinion (PCT/ISA/237) issued in PCT Application No. PCT/EP2021/081571 dated Mar. 1, 2022 (six (6) pages).

German-language Search Report issued in German Application No. 10 2020 131 236.9 dated Jun. 10, 2021 with partial English translation (14 pages).

English translation of Chinese-language Office Action issued in Chinese Application No. 202180063904.7 dated May 17, 2025 (8 pages).

* cited by examiner

ENERGY ABSORPTION DEVICE WITH PEDESTRIAN PROTECTION FUNCTION FOR A MOTOR VEHICLE

BACKGROUND AND SUMMARY

The present invention relates to an energy absorption device having a pedestrian protection function for a motor vehicle, for example, a passenger car or a truck, which has a deformation structure, which is deformable at different force levels in a switchable manner on an impulse-dependent basis.

A known front section of a motor vehicle has, for example, a bumper crossmember, which is attached at front ends of longitudinal beams, and a bumper covering, wherein a soft foam, which is deformable at a comparatively low load level, is arranged between the bumper covering and the bumper crossmember for protecting pedestrians. The soft foam is arranged, due to pedestrian protection, in order to protect a pedestrian, if necessary, against a direct imminent collision with a hard, rigid structure of the motor vehicle, such as, for example, the bumper crossmember.

Moreover, there is a requirement that the motor vehicle remain damage-free in the event of a collision in a very low speed range of up to, for example, 4 km/h, in which the pedestrian protection is not relevant due to the low speed. To this end, a penetration depth of a collision opponent should be as shallow as possible.

In addition, at a slightly higher speed, which is also not yet relevant for pedestrian protection, there is a requirement that damage incurred in a collision be as minor as possible and, for example, a radiator structure, which is located in the front section area, not be damaged. To this end, it would be helpful if the structure that is located in front of the bumper crossmember already has sufficient capacity to absorb collision energy. To this end, a penetration depth of a collision opponent should also be as shallow as possible.

The various requirements partly conflict with one another and require a comparatively long vehicle overhang at the vehicle front nose section and, thereby, a higher weight and a disadvantageous influence of the vehicle dynamics.

In order to resolve the resultant conflicting goals, a bumper arrangement was provided, for example, in DE 102010054641 A1, that includes a crossmember, which is attached via crash boxes at the vehicle body. A pedestrian protection element is formed in front of the crossmember in the direction of travel for a soft impact of a pedestrian. A swivelable energy absorption element is additionally provided, which is swivelable in front of the pedestrian protection element and, as a result, enables an increased absorption of energy during collisions in which a greater collision energy absorption capacity of the crash structure of the motor vehicle is required.

DE 102012112636 A1 also describes a bumper arrangement that includes a bumper crossmember and a pedestrian protection element, which can be switched by means of an actuator from a rigid state into a comparatively soft state, which is used for pedestrian protection.

What the bumper arrangements described in DE 102010054641 A1 and DE 102012112636 A1 have in common is that a crash or pre-crash sensor system is required therefor, wherein, based on the output signals of the sensor system, a switch can be carried out between a hard, rigid state of the crash structure with a high collision energy absorption capacity and a soft state of the crash structure having a lower collision energy absorption capacity, which enhances pedestrian protection.

Moreover, DE 102016204264 A1 makes known a deformation structure of the type in question, which has at least a first layer and a second layer, which are arranged so as to be spaced apart from each other and displaceable relative to each other in the deformation direction or load direction. The first layer and the second layer have complementary projections and recesses, which are formed in such a way that the projections of the first layer and the recesses of the second layer as well as the projections of the second layer and the recesses of the first layer are reciprocally immersible. The first layer and the second layer are connected to each other via deformable web elements in such a way that, in the case of a high impulse in the deformation direction, the projections of the first layer plunge into the recesses of the second layer and the projections of the second layer plunge into the recesses of the first layer, enabling a deformation of the deformation structure in the deformation direction to take place at a relatively low force level, and that, in the case of a low impulse in the deformation direction, the projections of the first layer impact the projections of the second layer, enabling a further deformation of the deformation structure in the deformation direction to take place at a relatively high force level.

This switchable deformation structure makes it difficult to place a reliable collision detection sensor, however.

The object of the present invention is to provide an energy absorption device for a motor vehicle, which has a deformation structure that is switchable in an impulse-dependent manner and a motor vehicle that includes an energy absorption device of this type, wherein a collision can be reliably detected.

This object is achieved by an energy absorption device and a motor vehicle, having the features of the independent claims. Advantageous embodiments of the invention are specified in the dependent claims.

An energy absorption device according to the invention having a pedestrian protection function for a motor vehicle has a deformation structure, which is deformable at different force levels in a switchable manner on an impulse-dependent basis. Moreover, the energy absorption device has a sensor console, which is arranged in parallel to the deformation structure and protrudes in the deformation direction beyond the deformation structure toward the vehicle exterior. The sensor console is designed to support a collision detection sensor.

The deformation direction can essentially coincide with a longitudinal direction of the vehicle. The deformation direction corresponds to a potential collision direction. The sensor console protrudes forward with respect to the deformation structure in such a way that, in the event of a collision, a collision load initially acts upon the sensor console. Due to the collision load acting upon the sensor console, the collision detection sensor can detect the collision load. In this way, it is possible to detect a collision.

Preferably, the deformation structure and the sensor console are arranged directly adjacent to each other.

According to a preferred development of the energy absorption device according to the invention, the sensor console is deformable at a low force level.

A low force level means that the sensor console is deformable at most at a force level that corresponds to a force level at the beginning of a deformation of the deformation structure (before an impulse-dependent switching of the deformation structure takes place). The low force level for deforming the sensor console can be, for example, a maximum of 1 kN. A distance over which the sensor console is deformable at this low force level can be, for example, 30 mm.

As a result, the sensor unit can detect the collision more easily and with greater accuracy.

Advantageously, the sensor console is made up of a foam, for example, a pedestrian protection foam, which is usually arranged between a bumper covering and a bumper crossmember. The foam can be made up of expanded polypropylene, for example, having a density of 30 g/l.

Advantageously, the collision detection sensor is used for detecting a collision with a person, and so, in the event of a detected collision, active pedestrian protection measures can be initiated. Active pedestrian protection measures can include raising the hood and/or triggering a pedestrian protection airbag.

According to one development of the invention, the collision detection sensor is made up of a deformable, gas-filled tube and a pressure measuring unit for measuring a pressure of the gas in the tube.

If the tube is deformed due to a collision, a pressure change results in the tube, as the result of which inferences regarding a collision may be drawn.

Advantageously, the collision detection sensor is arranged at an outer end of the sensor console. The outer end refers to the end of the sensor console facing a vehicle exterior. This is the front end of the sensor console with respect to a deformation direction or collision direction.

As a result, a collision load acts as directly as possible upon the collision detection sensor, and so a collision is detectable in a more reliable and faster manner.

According to one further development of the present invention, the deformation structure has at least a first layer and a second layer, which are arranged so as to be spaced apart from each other and displaceable relative to each other in the deformation direction or load direction. The first layer and the second layer have complementary projections and recesses, which are formed in such a way that the projections of the first layer and the recesses of the second layer as well as the projections of the second layer and the recesses of the first layer are reciprocably immersible. The first layer and the second layer are connected to each other via a deformation control device in such a way that, in the case of a high impulse in the deformation direction, the projections of the first layer plunge into the recesses of the second layer and the projections of the second layer plunge into the recesses of the first layer, and so a deformation of the deformation structure in the deformation direction takes place at a relatively low force level, and that, in the case of a low impulse in the deformation direction, the projections of the first layer impact the projections of the second layer, and so a further deformation of the deformation structure in the deformation direction takes place at a relatively high force level and a greater force is transmittable by the deformation structure.

The deformation structure is deformable at different energy levels depending on a loading condition, i.e., a collision impulse, and therefore has different rigidities. The "switching" between the two rigidities takes place automatically regardless of a sensor system or an actuator. The setting of the rigidities is effectuated by a certain geometrically complementary shape of the first layer and of the second layer and the connection of the layers via a deformation control device. At the low impulse, projections of opposed layers impact each other. Due to the separate formation of the layers and the deformation control device, the deformation structure is cost-effectively manufacturable easily using manufacturing methods that are suitable for large quantities. Moreover, the requirements on the deformation control device, which is to control a deformation of the deformation structure, are different from requirements on the layers, which are to be sufficiently rigid and solid, to sufficiently transmit forces, in particular at the low impulse, and so the separate manufacture permits larger degrees of freedom in combination with a design according to demand.

Advantageously, the deformation control device can have multiple elastically deformable control webs. The control webs connect the layers to one another and determine, in particular, a spacing of the layers with respect to one another in a starting position and kinematics or a movement behavior of the layers in the event of a load application in the collision direction depending on the level of a collision impulse.

The elastic design of the control webs enables a reversibility of the deformation of the deformation structure, at least in certain cases.

According to one preferred development, at least two deformation control devices are provided. The deformation control devices are advantageously arranged at opposite ends or end sections of the first layer and of the second layer and are connected to the first layer and to the second layer.

As a result, a deformation of the deformation structure can be better controlled in the event of a loading condition.

According to one preferred development of the deformation structure, the first layer and the second layer are each formed, in particular as one piece, as an injection molded part, in particular being made of plastic.

As a result, the layers are cost-effectively manufacturable in large quantities. Moreover, the deformation structure can be formed to be sufficiently lightweight as a result.

According to another preferred development, the first layer and the second layer are each formed, in particular as one piece, by shaping a metal sheet. In particular, the layers are manufactured by deep drawing or roll forming. The layers can be made from a steel sheet or a light metal sheet.

The layers can also be cost-effectively manufactured in large quantities as a result. Moreover, particularly rigid, stable layers can be made from sheets/metal sheets.

According to yet another preferred development of the deformation structure, the first layer and the second layer are formed, in particular as one piece, as an extruded profile, in particular an aluminum extruded profile. The layers can also be cost-effectively manufactured, as a result, in relation to the weight and a high rigidity for the loading condition with a low collision impulse.

According to one development, the first layer and the second layer are also displaceable by the deformation control device in one direction in parallel relative to each other.

The deformation control device can in particular be designed in such a way that the deformation control device undergoes brittle and/or plastic failure at the high collision impulse, and wherein the deformation control device is reversibly elastically deformable at the low impulse. The deformation control device can have control webs, which act similarly to hinge kinematics. The control webs can effectuate a swivel movement of the first layer and of the second layer relative to each other, in which the first layer and the second layer are displaced in parallel to each other and in the deformation direction, i.e., toward each other.

As a result, a defined swivel movement of the first layer and of the second layer toward each other is possible and the rigidity-increasing position of the first layer and of the second layer relative to each other is reliably assumable.

At the high collision impulse, the failure of the control webs prevents the swivel movement of the first layer and of the second layer relative to each other. Due to the failure of the control webs, the first layer and the second layer are displaced toward each other only in the deformation direction essentially without lateral evasive movements.

Preferably, in the deformation structure according to the invention, the first layer and the second layer are essentially identically formed or shaped.

This simplifies a manufacture of the deformation structure. Moreover, as a result, complementary projections and recesses are possible in an easy way.

According to one preferred development of the deformation structure, the projections of the first layer and the recesses of the second layer as well as the recesses of the first layer and the projections of the second layer are arranged opposite one another in a starting position of the deformation structure.

As a result, the deformation structure can be deformed in a deformation direction at a low collision impulse at a relatively low force level.

According to a particularly preferred development, the first layer and the second layer are each formed in the shape of a corrugated plate. Peaks and troughs form the projections and recesses.

The projections and recesses (peaks and troughs) can preferably have a trapezoidal shape.

Due to this geometric shape, the projections and recesses of the opposed layers are easily displaceable into one another.

The deformation structure according to the present invention can have a plurality of layers, wherein two adjacent layers always form a first layer and a second layer. For example, the deformation structure can have three, four, five, six, or more layers.

In addition, preferably one or both outer layer(s), i.e., outer layers or end layers, are formed so as to be fixed in position.

Preferably, the deformation structure has an uneven number of adjacent layers, which are formed in pairs corresponding to the first layer and the second layer.

As a result, the two outermost layers can be formed so as to be fixed in position. In the case of the low impulse or low force application, only the layers arranged in-between shift in a lateral direction.

A particularly preferred deformation structure has precisely three layers.

This is the smallest unit in which the two outermost layers can be formed so as to be fixed in position. In this case, only the middle layer, which can be, for example, a second layer, undergoes a parallel displacement relative to the two outermost layers in the case of the low impulse.

Advantageously, the deformation control device is designed in such a way that adjacent layers are displaceable in opposite directions in the case of the low collision impulse. "Displacement effect" is intended to mean, for example, a swivel movement of the layers in opposite directions.

As a result, a uniform deformation of the deformation structure with the plurality of layers in the case of the low collision impulse is to be achieved.

Preferably, the deformation control device is designed to be in contact with the sensor console.

As a result, the sensor console can assist or influence the function of the deformation unit.

Preferably, the deformation structure and the sensor console are arranged between an exterior vehicle skin element and a body support element. The exterior vehicle skin element can be a bumper covering. The body support element can be a bumper crossmember.

One further aspect of the present invention relates to a motor vehicle, in particular a passenger car or a truck, with an energy absorption device according to the invention, which is arranged between an exterior vehicle skin element and a body support element.

Advantageously, the sensor console can extend in the transverse direction of the vehicle.

A deformation structure can be arranged underneath and also above the sensor console.

Advantageously, the sensor console can be attached to the bumper crossmember. The sensor console has a free, front end. Additionally or alternatively, the deformation structure can be attached to the bumper crossmember.

The sensor console and the deformation structure are supported on the body support element in the event of a collision impulse.

An outer layer of the deformation structure can be attached to the body support element so as to be fixed in position. The other outer layer can also be supported so as to be fixed in position. It is preferable when an uneven number of layers, in particular three layers, is provided.

Due to the motor vehicle according to the invention with the sensor console and the deformation structure, neither a collision sensor system nor an actuator system are necessary in order to actively lock or unlock a mechanical mechanism, if necessary, and, thereby, to be able to switch as necessary between a structure having a "soft" deformation behavior and a "rigid" deformation behavior. The motor vehicle according to the invention with the sensor console and the deformation structure automatically acts depending on a collision impulse, which in turn depends on a collision speed of the motor vehicle. The deformation direction is, in particular, a collision direction and is essentially a longitudinal direction of the vehicle in the application for pedestrian protection in the motor vehicle front nose section.

Accordingly, at the low collision impulse and, thereby, the low collision speed of the motor vehicle, a swiveling of the opposed layers takes place in such a way that the projections of the opposed layers are situated opposite each other and are supported against each other. The deformation structure therefore stiffens. At the high collision impulse and, thereby, the high collision speed, the opposed layers do not swivel, and so the opposed projections and recesses of the opposed layers are displaceable into each other. The deformation structure therefore responds in a softer manner over a longer deformation distance.

For example, the deformation structure can be formed in such a way that, at a collision impulse that is generated up to a threshold speed of the motor vehicle, the deformation structure responds in a stiffer manner and is deformed at a higher force. Therefore, at the low collision speed, a collision load can be transmitted onto the underlying body element—at a very low speed—or a sufficient energy absorption by the deformation structure takes place in order to protect underlying components—at a slightly higher speed, which is below the threshold speed, however. In any case, the repair costs can therefore be reduced, wherein, in particular at the very low speed—for example, in the case of so-called parking bumps, for example, up to 4 km/h—the repair costs may be limited to repairing, for example, paint damage.

The threshold speed can be, for example, 20 km/h, or the like.

Moreover, the pedestrian protection device can be formed in such a way that, at a collision impulse that is generated above and including the threshold speed of the motor vehicle, the deformation structure responds in a softer manner and is deformed at a lower force. This is particularly advantageous in the event of the head-on collision of the pedestrian with the motor vehicle at the threshold speed, since lower collision forces act upon the pedestrian in this case.

Above-described developments of the invention can be combined with one another in any way, where possible and appropriate.

DETAILED DESCRIPTION OF THE DRAWINGS

An exemplary embodiment of the present invention is described in the following with reference to FIGS. 1 through 5.

Figure 1:
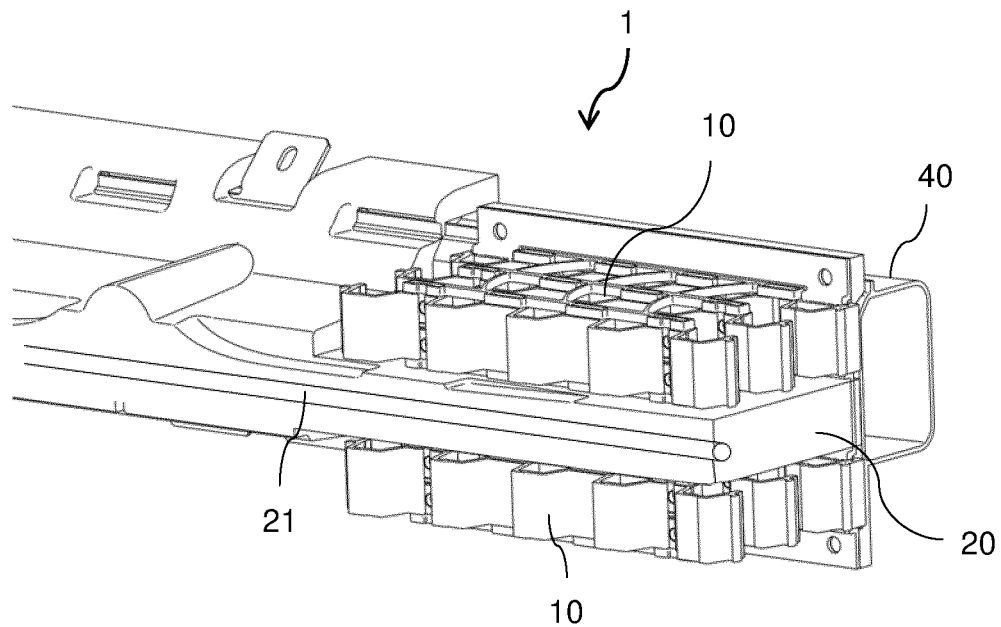
FIG. 1 schematically shows a perspective view of an energy absorption device according to one exemplary embodiment of the present invention.

FIG. 1 shows a perspective view of an energy absorption device 1 according to the first exemplary embodiment of the present invention in a starting position. The energy absorption device 1 is formed at a front end of a motor vehicle frame forestructure, in particular of a motor vehicle front nose section, at a bumper crossmember 40. The bumper crossmember 40 is connected to a left-hand engine longitudinal support via a left-hand crash box and to a right-hand engine longitudinal support via a right-hand crash box. The energy absorption device 1 is arranged in a space between an exterior vehicle skin (not shown), this means, a bumper covering, and the bumper crossmember 40.

As shown in FIG. 1, the energy absorption device 1 has multiple deformation structures 10, which are deformable at different force levels in a switchable manner on an impulse-dependent basis. In particular, one pair of deformation structures 10 is shown in FIG. 1. One pair of deformation structures 10 is made up of a lower deformation structure 10 and an upper deformation structure 10.

The lower deformation structure 10 and the upper deformation structure 10 are slightly spaced apart from each other in the vertical direction of the vehicle. Due to this arrangement in pairs and so as to be spaced apart, an effect of the deformation structure 10 can be increased in the vertical direction of the vehicle. The pairs of deformation structures 10 are attached to the bumper crossmember 40 at points intended for this purpose. Advantageously, multiple pairs of deformation structures 10 are arranged in the transverse direction of the vehicle. For example, one pair of deformation structures 10 can be arranged in a left middle area of the bumper crossmember 40 and one pair of deformation structures 10 can be arranged in a right middle area of the bumper crossmember 40. Moreover, the energy absorption device 1 has a sensor console 20, which, in parallel to and directly adjacent to the deformation structures 10, is also attached to the bumper crossmember 40. In particular, the sensor console extends between the pair of deformation structures 10. The sensor console 20 protrudes in the longitudinal direction of the vehicle, i.e., in a potential collision direction and deformation direction, forward beyond the deformation structure 10 toward the bumper covering by approximately 10 mm to 40 mm. The sensor console 20 extends in the transverse direction of the vehicle essentially over an entire length (in the y-direction) of the bumper crossmember 40. The sensor console 20 acts as a holder for a collision detection sensor 21. The sensor console is made up of a known pedestrian protection foam, which is deformable at a low force level.

As shown in FIG. 1, the pairs of deformation structures 10 are not arranged over an entire width of a bumper crossmember 40. A known pedestrian protection foam is arranged in areas at which there are no deformation structures 10 arranged between the bumper crossmember 40 and the bumper covering. The sensor console 20 extends over the entire width of the bumper crossmember 40.

A mode of operation of the deformation structure 10 is explained in the following with reference to FIGS. 3, 4, and 5.

Figure 2:
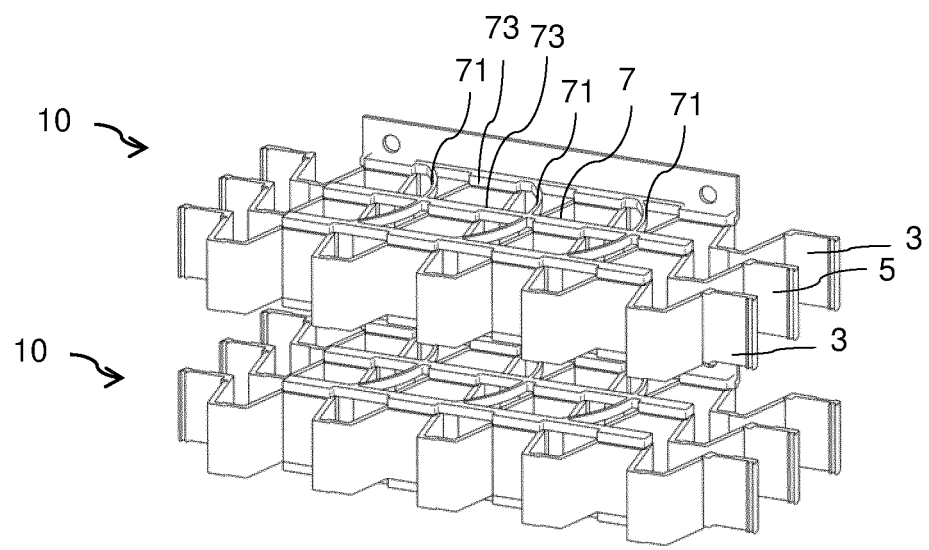
FIG. 2 schematically shows a perspective view of a deformation structure of the energy absorption device according to the exemplary embodiment of the present invention.

As shown in FIG. 2, the deformation structure 10 has precisely three layers 3, 3 arranged one behind the other. The layers 3, 5, 3 are spaced apart from one another and are connected to one another on opposite sides of the layers 3, 5, 3 via two deformation control devices 7. The two deformation control devices 7 are fixedly connected to each layer 3, 5, 3 at multiple points, i.e., three points in this exemplary embodiment. Each deformation control device 7 has three control webs 71 for each pair of layers. The control webs 71 are designed to be oblique or curved in such a way that the control webs 71 deploy a hinge effect in a certain direction depending on a collision load or a collision impulse. The control webs 71 each extend between two opposed attachment webs 73. The control webs 71 between the uppermost layer 3 and the middle layer 5 are formed counterdirectional to the control webs 71 between the middle layer 5 and the lowermost layer 3, and so their hinge effects point in opposite directions. Each attachment web 73 is assigned to one of the layers 3, 5, 3. Three projections are arranged at each attachment web 73 for engaging with a corresponding opening in the associated layer 3, 5, 3. Each deformation control device 7 is made as one piece from a plastic injection molding. The deformation control device 7 can also have more or fewer control webs 71. This depends in particular also on the dimensions of the layers 3, 5, 3 or of the deformation structure 10. More than three layers, preferably in an uneven number, are also possible. The deformation control device therefore has a corresponding number of attachment webs in this case. The hinge effect of the control webs extends in opposite directions in this case for each adjacent pair of layers.

The layers 3, 5, 3 of the deformation structure 10 are made from an aluminum extruded profile. As a result, the layers can be cost-effectively manufactured and cut to the required length. It is also conceivable to manufacture the layers 3, 5, 3 from aluminum in another manufacturing process. The layers 3, 5, 3 have a trapezoidal shape.

The deformation control device 7 has projections, which are provided for engagement with associated lateral openings 37, 57 (see FIGS. 3, 4, 5) of the layers 3, 5, 3. Moreover, the projections 51 of the layers 5 have steps 55. The projections 31 of the layers 3 have recesses 33 or steps 33 that are complementary to the steps 55. During the collision with the relatively low collision impulse, opposed steps 55 and recesses 33 impact each other and form a form-locking engagement in a lateral direction or transverse direction, as shown in FIG. 4. As a result, the layers 3, 5, 3 remain in the position in a more stable manner and a force application onto the bumper crossmember is reliably established.

In the event of a collision of the motor vehicle, a collision force is transmitted from the bumper covering onto the sensor console 20, and so the collision detection sensor 21 can detect a collision. During the collision, the collision load acts in the area of the deformation structure 10 initially upon the sensor console 21, and so the sensor console 21 is deformed at a low force level, until the collision load impacts the deformation structure 10, which then determines a deformation force level. A deformation force level of the sensor console 20 is not greater than a deformation force level of the deformation structure 10.

Figure 3:
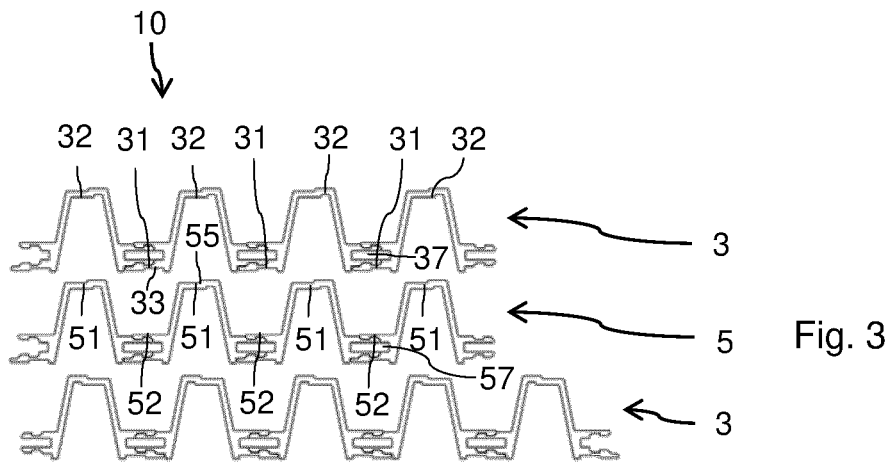
FIG. 3 schematically shows a side view of the deformation structure according to the exemplary embodiment of the present invention in a starting position.

FIG. 3 shows a starting position or normal position of the layers 3, 5, 3 (corresponding to the perspective view in FIG. 2) prior to a collision.

Figure 4:
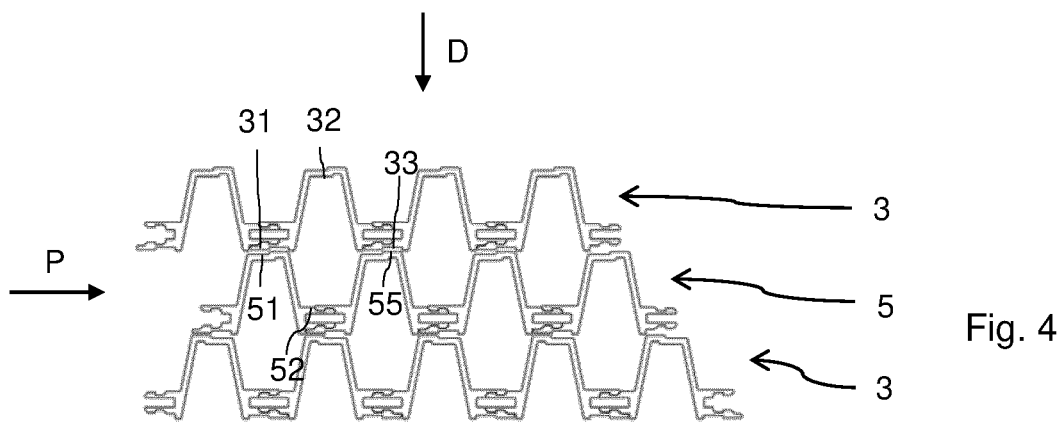
FIG. 4 schematically shows a side view of the deformation structure according to the exemplary embodiment of the present invention in a collision loading condition with a low collision impulse.
Figure 5:
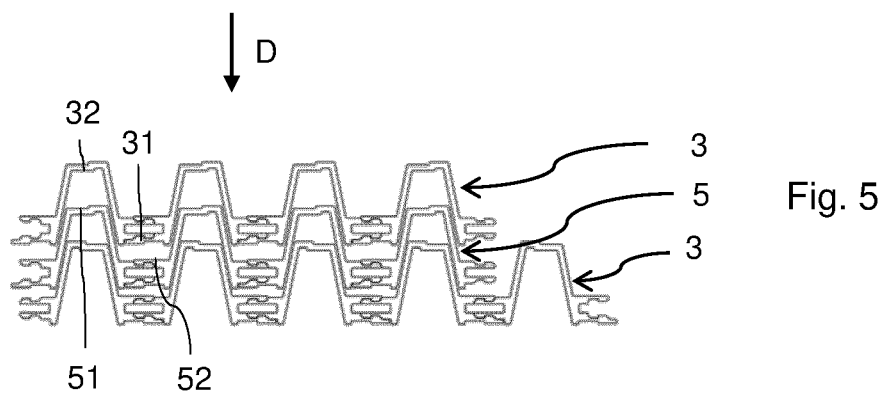
FIG. 5 schematically shows a side view of the deformation structure according to the exemplary embodiment of the present invention in a collision loading condition with a high collision impulse.

A function of the deformation structure 10 at different collision loading conditions is shown with reference to FIGS. 4 and 5. In the event of a head-on collision of the motor vehicle with an object or a person, a load, or at least a resultant collision load, acts upon the deformation structure 10 in the longitudinal direction of the vehicle, i.e., the deformation direction D, wherein the front layer 3 (the uppermost layer in the figures) is displaced toward the middle layer 5 with elastic deformation of the control webs 71. Moreover, the middle layer is displaced toward the rear layer 3 (the lowermost layer in the figures). In the starting position of the deformation structure 10, which is shown in FIG. 3, the projections 31 of the layers 3 and the recesses 52 of the layers 5 as well as the recesses 32 of the layers 3 and the projections 51 of the layers 5 are situated opposite each other. If the layers 3 and the layers 5 were not connected to each other via the control webs 71, adjacent layers 3, 5 would be displaced from this starting position essentially unobstructed with only low resistance toward each other and into each other.

FIG. 4 shows the collision loading condition at the low collision impulse, which takes place, for example, at a collision speed of the motor vehicle of below a predefined collision speed of 20 km/h and which is less relevant for pedestrian protection. FIG. 5 shows a collision loading condition at a high collision impulse, which takes place, for example, at a collision speed of the motor vehicle equal to or above the predefined collision speed 20 km/h. The predefined collision speed is stated only by way of example here and can also have a different value.

Initially, a function of the deformation structure 10 during the collision of the motor vehicle at the collision speed of less than 20 km/h is described with reference to FIG. 4.

The control webs 71 are arranged and configured in such a way that, at the low collision impulse, the adjacent layers 3, 5 undergo a swivel movement relative to each other while being pressed towards each other. Since the lowermost layer 3 is fixed at the bumper crossmember and the uppermost layer 3 is also essentially fixed in position due to the force effect during the collision, only the middle layer 5 can get out of the way and be displaced in parallel in the direction P, which is predefined by the control webs 71. The control webs 71 act, for example, as so-called film hinges, which assist the swivel movement and define the swivel path. With this swivel movement, in addition to the movement toward each other, a parallel displacement of the adjacent layers 3 and 5 with respect to each other takes place. The projections 31 of the layers 3 enter a position situated opposite to the projections 51 of the layers 5 until the top sides or end faces of the projections 31 of the layers 3 come into contact with the top sides or end faces of the projections 51 of the layers 5 (the state that is shown in FIG. 4). The top sides or the end faces of the projections 31 and 51 can be designed in such a way that a further parallel displacement of the layers 3 and 5 relative to each other is made difficult. For example, the projections 31 and 51 can be provided with a measure that increases a friction coefficient, for example, a ribbing.

Therefore, in the case of the slow collision speed and, thereby, the low collision impulse, the deformation structure 10 transmits, depending on the collision load level, the collision load in the state from FIG. 4 directly onto an underlying structure of the motor vehicle, i.e., the bumper crossmember 40, or the individual layers 3, 5, 3 of the deformation structure 10 undergo brittle failure by breaking after the projections 31, 51 impact each other and/or fail due to plastic deformation at a higher load level than at the faster collision speed. Preferably, the deformation structure 10 is designed in such a way that the deformation structure 10 does not fail and, thereby, a penetration depth of a collision opponent remains shallow. The penetration depth of the obstacle or of the opposing vehicle is initially shallower due to the shallow deformation of the deformation structure, and so-called crash boxes, via which the bumper crossmember is connected to longitudinal beams (engine longitudinal supports) of the body, can sufficiently absorb collision energy. Overall, damage to the motor vehicle can be kept sufficiently low in this way.

In particular, the deformation structure 10 can be designed in such a way that, at collision speeds of, for example, less than 4 km/h, the deformation structure 10 can transmit a collision load onto the crash structure without failure of the deformation structure 10. That means, the control webs 7 are merely elastically deformed and the structure of the layers 3 and 5 itself does not fail. This is advantageous when, in the case of so-called parking bumps, or the like, no damage to the motor vehicle is to occur that requires repair, and affects, for example, an insurance classification of the motor vehicle. The deformation structure 10 moves, after the parking bump, elastically back into its starting position due to the elastic restoring force of the deformation control devices 7. At collision speeds of 4 km/h up to approximately 20 km/h, the collision energy is so high that the crash boxes must absorb collision energy via deformation, wherein the collision load is transmitted onto the crash boxes via the bumper crossmember via the position of the deformation structure 1 (preferably without further deformation) shown in FIG. 4. The damage at the front end of the vehicle frame forestructure can be kept relatively low overall, however, due to the aforementioned shallow penetration depth.

In the following, a function of the deformation structure 10 during the collision of the motor vehicle at the collision speed equal to or greater than 20 km/h is described with reference to FIG. 5.

The control webs 71 are arranged and configured in such a way that the control webs 71 fail or are more or less folded up at a high collision impulse, and so the control webs 71 are not able to deploy a hinge effect. The mass inertia of the layers 3, 5, 3 at the high collision impulse is, in particular, so great that the control webs 71 cannot effectuate or assist a lateral evasive maneuver (parallel displacement) of the layers 3, 5, 3 relative to each other. As a result, the projections 31 of the layers 3 and the recesses 52 of the layers 5 as well as the projections 51 of the layers 5 and the recesses 32 of the layers 3 are moved directly toward each other. As the collision and the deformation of the deformation structure 1 continue, the projections 31 of the layers 3 are completely displaced into the recesses 52 of the layers 5. Similarly, the projections 51 of the layers 5 are completely displaced into the recesses 32 of the layers 3. Since a deformation of the structure of the layers 3 or of the layers 5 is essentially not necessary for this purpose and only the control webs 71 are deformed, a deformation of the deformation structure 1—at least up to the state shown in FIG. 4—takes place at a relatively low force level.

This is advantageous in this regard, since it is important at the collision speed of approximately 20 km/h that the front end of the motor vehicle frame forestructure, and in particular the bumper covering in connection with the deformation structure 1, responds in a sufficiently soft manner at a low deformation force level in order to protect a pedestrian. The front end then acts as soft as in the arrangement of the known pedestrian protection foam instead of the deformation structure according to the invention. If the collision opponent is a pedestrian, at a speed of approximately 20 km/h and higher, a relatively low force therefore advantageously acts upon the pedestrian.

Overall, due to the deformation structure 1 according to the invention, conflicting goals can therefore be resolved, which, on the one hand at very low collision speeds, which are not relevant for pedestrian protection, enables a sufficiently high rigidity of the deformation structure 1 or a sufficiently high deformation force level of the deformation structure 1 or a sufficiently high force transmission onto the underlying structure with the bumper crossmember into the crash boxes, and at a slightly higher collision speed, which is relevant for pedestrian protection, ensures sufficient pedestrian protection by means of a low deformation force level.

The invention claimed is:

1. A motor vehicle comprising:
   an energy absorption device, having a pedestrian protection function for a motor vehicle, the energy absorption device comprising:
   a deformation structure deformable at different force levels in a switchable manner on an impulse-dependent basis; and
   sensor console arranged in a deformation direction in parallel to the deformation structure and protruding in the deformation direction beyond the deformation structure toward a vehicle exterior, wherein the sensor console holds a collision detection sensor;
   wherein the energy absorption device is arranged between an exterior vehicle skin element and a body support element; and
   wherein the sensor console extends in a transverse direction of the vehicle and the deformation structure is arranged underneath as well as above the sensor console.

2. The motor vehicle according to claim 1, wherein the sensor console is deformable at a low force level and is made of a foam.

3. The motor vehicle according to claim 1, wherein the collision detection sensor is used for detecting a collision with a person in order to initiate active pedestrian protection measures when the collision has been detected.

4. The motor vehicle according to claim 1, wherein the collision detection sensor comprises a deformable, gas-filled, tube and a pressure measuring unit for measuring a pressure of gas in the tube.

5. The motor vehicle according to claim 1, wherein the collision detection sensor is arranged at an outer end of the sensor console.

6. The motor vehicle according to claim 1, wherein the deformation structure comprises:
   at least a first layer and a second layer, which are spaced apart from each other in the deformation direction and are arranged so as to be displaceable relative to each other,
   the first layer and the second layer have complementary projections and recesses, which are formed such that the projections of the first layer and the recesses of the second layer as well as the projections of the second layer and the recesses of the first layer are introducible into one another, and
   the first layer and the second layer are connected to each other via a deformation control unit such that:
   (i) at a high impulse in the deformation direction, the projections of the first layer are introduced into the recesses of the second layer and the projections of the second layer are introduced into the recesses of the first layer, and so a deformation of the deformation structure in the deformation direction takes place at a low force level, and
   (ii) at a low impulse in the deformation direction, the projections of the first layer impact the projections of the second layer, and so a deformation of the deformation structure in the deformation direction takes place at a high force level.

7. The motor vehicle according to claim 1, wherein a deformation control device is arranged in contact with the sensor console.

8. The motor vehicle according to claim 1, wherein the deformation structure and the sensor console are arranged between an exterior vehicle skin element and a body support element.

9. The motor vehicle according to claim 8, wherein the body support element is a bumper crossmember.

10. The motor vehicle according to 1, wherein the sensor console and the deformation structure are attached to a bumper crossmember as the body support element.

* * * * *